(12) United States Patent
Hesener

(10) Patent No.: US 7,339,358 B2
(45) Date of Patent: Mar. 4, 2008

(54) SWITCHING CONVERTER AND METHOD FOR DRIVING A SWITCH IN A SWITCHING CONVERTER

(75) Inventor: Alfred Hesener, München (DE)

(73) Assignee: Infineon Technologies AG, Munich (DE)

( * ) Notice: Subject to any disclaimer, the term of this patent is extended or adjusted under 35 U.S.C. 154(b) by 706 days.

(21) Appl. No.: 10/662,793

(22) Filed: Sep. 15, 2003

(65) Prior Publication Data

US 2006/0203527 A1    Sep. 14, 2006

Related U.S. Application Data

(63) Continuation of application No. PCT/EP02/02527, filed on Mar. 7, 2002.

(30) Foreign Application Priority Data

Mar. 15, 2001   (DE) ................. 101 12 539

(51) Int. Cl.
*G05F 1/40* (2006.01)
(52) U.S. Cl. .................... 323/283
(58) Field of Classification Search ............... 323/283; 363/21.05, 21.13, 21.07, 21.15
See application file for complete search history.

(56) References Cited

U.S. PATENT DOCUMENTS

| | | |
|---|---|---|
| 4,541,041 A | 9/1985 | Park et al. |
| 4,855,888 A | 8/1989 | Henze et al. |
| 4,964,028 A | 10/1990 | Spataro |
| 5,657,215 A | 8/1997 | Faulk |
| 5,889,660 A | 3/1999 | Taranowski et al. |
| 5,905,370 A * | 5/1999 | Bryson ...................... 323/283 |
| 6,275,018 B1 | 8/2001 | Telefus et al. |
| 6,351,162 B1 * | 2/2002 | Schwartz .................... 327/110 |
| 6,385,059 B1 | 5/2002 | Telefus et al. |

FOREIGN PATENT DOCUMENTS

DE    32 41 738 A1    5/1984

(Continued)

OTHER PUBLICATIONS

Jens Peer Stengl et al.: "Leistungs-MOS-FET-Praxis" [power MOSFET practice], *Pflaum Verlag, München*, 2$^{nd}$ ed., 1992, pp. 173-176.

(Continued)

*Primary Examiner*—Shawn Riley
(74) *Attorney, Agent, or Firm*—Laurence A. Greenberg; Werner H. Stemer; Ralph E. Locher

(57) ABSTRACT

A switching converter has a switch, a rectifier arrangement connected to the switch, a controller arrangement providing a control signal dependent on the output voltage at the output terminals of the rectifier arrangement, and a drive circuit providing drive pulses for turning the switch on and off. The drive circuit generates identical drive pulses of identical form and duration, whose frequency is dependent on the control signal. The frequency is a measure of how many drive pulses are generated per unit time. The minimum time interval between two successive drive pulses and thus the maximum switching frequency of the switch is chosen such that the power loss that occurs at the maximum switching frequency meets the respective requirements, for example, with regard to the available cooling possibilities.

14 Claims, 5 Drawing Sheets

FOREIGN PATENT DOCUMENTS

| | | |
|---|---|---|
| EP | 0 877 468 A2 | 11/1998 |
| JP | 04058760 A | 2/1992 |
| JP | 06 283 638 | 10/1994 |

OTHER PUBLICATIONS

U. Tietze et al.: "Halbleiter-Schaltungstechnik" [semiconductor circuit technology]. *Springer Verlag, Berlin, 9th ed.*, pp. 561-576, and pp. 502-515 of the corresponding English translation.

Gregory M. Cooley et al.: "PWN and PCN Techniques for Control of Digitally Programmable Switching Power Supplies", *IEEE*, 1995, pp. 1114-1117, XP 000558871.

John G. Proakis: "Digital Communications", McGraw Hill International Editions, 3rd *ed.*, 1995, pp. 842-844, and 852-862.

\* cited by examiner

SWITCHING CONVERTER AND METHOD FOR DRIVING A SWITCH IN A SWITCHING CONVERTER

CROSS-REFERENCE TO RELATED APPLICATION

This is a continuing application, under 35 U.S.C. § 120, of co-pending international application No. PCT/EP02/02527, filed Mar. 7, 2002, which designated the United States; the application also claims the priority benefit, under 35 U.S.C. § 119, of German patent application DE 101 12 539, filed Mar. 15, 2001.

The present invention relates to a switching converter and a method for driving a switch in a switching converter.

BACKGROUND OF THE INVENTION

FIELD OF THE INVENTION

Switching converters generally have a switch and a rectifier arrangement connected to the switch, the rectifier arrangement having output terminals for providing an output voltage. The general construction of various switching converters is described for example in Tietze, Schenk: "Halbleiterschaltungstechnik" ["Semiconductor circuitry"], 9th edition, Springer Verlag, Berlin, 1991, pages 561-576, or Stengl, Tihanyi: "Leistungs-MOS-FET-Praxis" ["Power MOSFETS in practice"], 2nd edition, Pflaum Verlag, 2nd edition, 1992, pages 173-176. What is common to the different converter concepts is that the rectifier arrangement is connected to a supply voltage via the switch, the task of the switching converter being to provide an at least approximately load-independent output voltage. The output voltage, or the power consumption and the power output can be controlled by clocked opening and closing of the switch.

In fixedly clocked switching converters, the switch is closed at fixed time intervals and the duration for which the switch remains closed after the closing process is in this case dependent on the power consumption of the load or on the output voltage. As the power consumption rises, the output voltage initially decreases, the duration of the drive pulses being increased in order to take up more power and output it to the load and thus counteract a further decrease in the output voltage. With small loads, the switch remains closed only for a very short time, the switching losses increasing more than proportionally. Therefore, complicated additional circuits are required which, with small loads, drive the switch in such a way that the switching losses remain small.

In free-running switching converters, the clock frequency with which the switch is opened and closed is dependent on the power consumed by a load. In such switching converters, a primary coil of a transformer is usually connected downstream of the switch, which primary coil takes up energy when the switch is closed and, when the switch is subsequently opened, outputs the stored energy to a secondary coil inductively coupled to the primary coil and, via a rectifier connected to the secondary coil, to the load. For the driving of the switch, it is known to switch the switch on again after the opening process when the coil connected downstream of the switch has output its energy. In the case of loads with a small power consumption, the switch in each case remains closed only briefly, which has the consequence that the energy taken up per switch-on operation is small and the duration of the outputting of energy to the secondary side is correspondingly short. This results in a high switching frequency with increasing switching losses. Therefore, free-running switching converters also require complicated additional circuits in order to limit the switching losses with small loads. A free-running switched-mode power supply with such an additional circuit is described for example in 197 32 169 A1.

SUMMARY OF THE INVENTION

Therefore, it is an aim of the present invention to provide a switching converter in which a voltage supply even of small loads is possible without requiring complicated additional circuits for preventing an increase in the power loss. It is furthermore an aim of the invention to provide a method for driving a switch in a switching converter in which an increase in the power loss in loads with a small power consumption is prevented.

The switching converter according to the invention has a switch having a control terminal and a first and second load terminal, a rectifier arrangement connected to the switch and having output terminals, at which an output voltage is available for a load, a controller arrangement, which provides a control signal dependent on the output voltage, and a drive circuit, which provides drive pulses according to which the switch turns on or turns off. In this case, the drive circuit generates identical drive pulses, that is to say drive pulses of identical form and duration, whose frequency is dependent on the control signal. The frequency is a measure of how many drive pulses are generated per unit time.

The minimum time interval between two successive drive pulses and thus the maximum switching frequency of the switch is in this case fixedly prescribed and chosen such that the power loss that occurs at the maximum switching frequency meets the respective requirements, for example with regard to the available cooling possibilities.

The drive circuit has a comparator arrangement, which, at periodic time intervals according to a clock signal, compares the control signal with a reference signal and does or does not generate a drive pulse depending on this comparison. The period duration of said clock signal determines the minimum time interval between two drive pulses.

In accordance with one embodiment, the control signal is chosen such that it increases as the output voltage decreases. If the control signal exceeds the reference signal on account of a decrease in the output voltage at one of the periodically recurring comparison instants, then the drive circuit generates a drive pulse, as a result of which the switching converter takes up energy via the supply voltage and outputs it to the load. In the switched-mode power supply according to the invention, the energy taken up per switch-on operation is in each case identical and dependent on the duration of the switch-on operation and the supply voltage. Energy is taken up via the supply voltage only in discrete quantities of energy in the case of the switching converter according to the invention. In this case, the maximum power that can be taken up is dependent on the minimum time interval between two drive pulses or on the period duration of the clock signal according to which a comparison is made between the reference signal and the control signal.

In order to form the control signal from the output voltage or from a signal proportional to the output voltage, the switching converter has a controller arrangement, which preferably has a proportional-integral controller. The controller arrangement forms the control signal preferably from a differential signal made from the output voltage, or a signal proportional to the output voltage, and a reference signal, the differential signal increasing as the output voltage decreases.

The controller arrangement is preferably designed in such a way that the control signal has a signal component which is formed by integration of the differential signal. The output voltage is subject to fluctuations on account of the energy consumption of the switching converter in discrete energy packets of identical magnitude, which fluctuations are compensated for by the integration of the differential signal in order to prevent a feedback of said fluctuations in the control loop.

The driving of the switch according to the concept of the invention is not restricted to specific types of switching converters. A drive circuit for driving the switch according to the method of the invention can be realized with a comparatively low outlay on circuitry and can therefore be used advantageously in a multiplicity of applications.

The present invention is explained in more detail below using exemplary embodiments shown in the figures.

DESCRIPTION OF THE PREFERRED EMBODIMENTS

In the figures, unless specified otherwise, identical reference symbols designate identical elements and signals with the same meaning.

Figure 1:
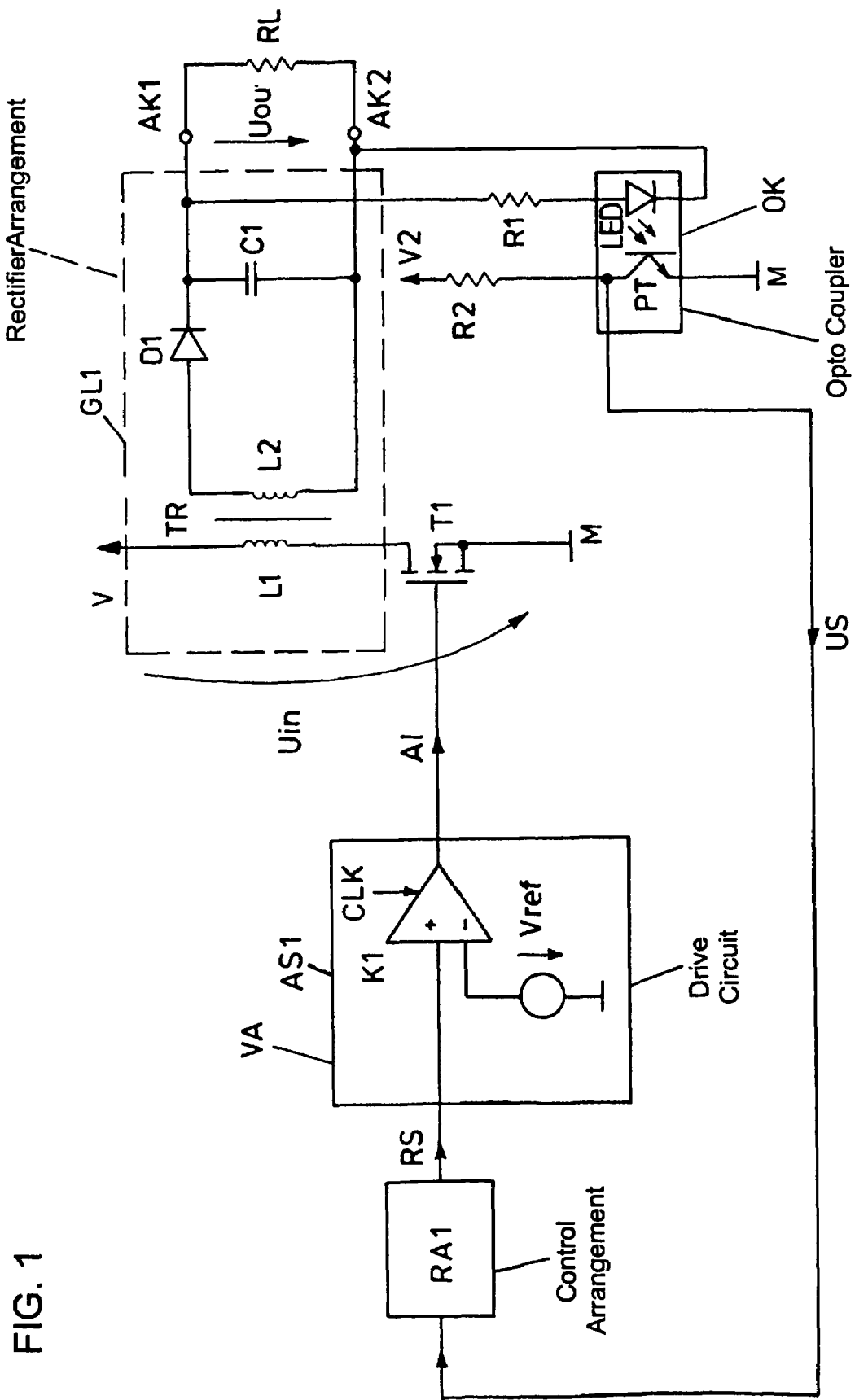
FIG. 1 shows a first exemplary embodiment of a switching converter according to the invention with a switch, a rectifier arrangement connected to the switch, a controller arrangement and a drive circuit.

FIG. 1 shows a first exemplary embodiment of a switching converter according to the invention, which provides an approximately load-independent output voltage Uout from an input voltage Uin. The switching converter has a switch T1, which is designed as a power transistor and is connected, in series with a primary coil L1 of a transformer TR, to an input voltage Uin between a terminal for supply potential and a terminal for reference-ground potential M. The primary coil L1 is inductively coupled to a secondary coil L2, a rectifier, which comprises a series circuit of a diode D1 and a capacitor C1 in the exemplary embodiment, being connected downstream of the secondary coil L2. An output voltage Uout can be tapped off at output terminals AK1, AK2 at the capacitor C1. A load RL, represented as a nonreactive resistor in the exemplary embodiment, can be connected to the output terminals AK1, AK2. The arrangement with the transformer TR, and the rectifier, generally forms a rectifier arrangement GL1 which is connected, in series with the power transistor T1, to the supply voltage Uin.

When the power transistor T1 is in the on state, the primary coil L1 takes up energy and subsequently outputs it, when the power transistor T1 is in the off state, to the load RL via the secondary coil L2 and the rectifier D1, C1.

In order to drive the power transistor T1 a drive circuit AS1 is provided, which generates drive pulses AI according to a control signal RS. The power transistor T1 turns on according to the drive pulses AI, these drive pulses being fed directly to the gate terminal G of the power transistor T1 in the exemplary embodiment in accordance with FIG. 1.

The control signal RS is generated by a controller arrangement RA1 in a manner dependent on the output voltage Uout. For this purpose, an output voltage signal US is fed to the controller arrangement RA1. In order to provide this output voltage signal US, provision is made of an optocoupler OK with a light-emitting diode and a phototransistor PT. The light-emitting diode LED is connected in series with a resistor R1 between the output terminals AK1, AK2 of the rectifier arrangement GL1. The collector-emitter path of the phototransistor PT is connected in series with a resistor R2 between a supply potential V2 and reference-ground potential M. The output voltage signal US, proportional to the output voltage Uout, represents a voltage with respect to reference-ground potential M which can be tapped off at the collector of the phototransistor PT.

The controller arrangement RA1 is designed in such a way that it provides a control signal RS which rises as the output voltage Uout decreases. The construction of such a controller arrangement RA1 will be explained with reference to FIGS. 5 and 6.

The drive circuit AS1 for generating the drive pulses AI depending on the control signal RS has a clocked comparator arrangement K1, one input of which is fed the control signal RS and the other input of which is fed a reference voltage Vref. The method of operation of such a clocked comparator arrangement K1 is explained below with reference to FIG. 2.

Figure 2:
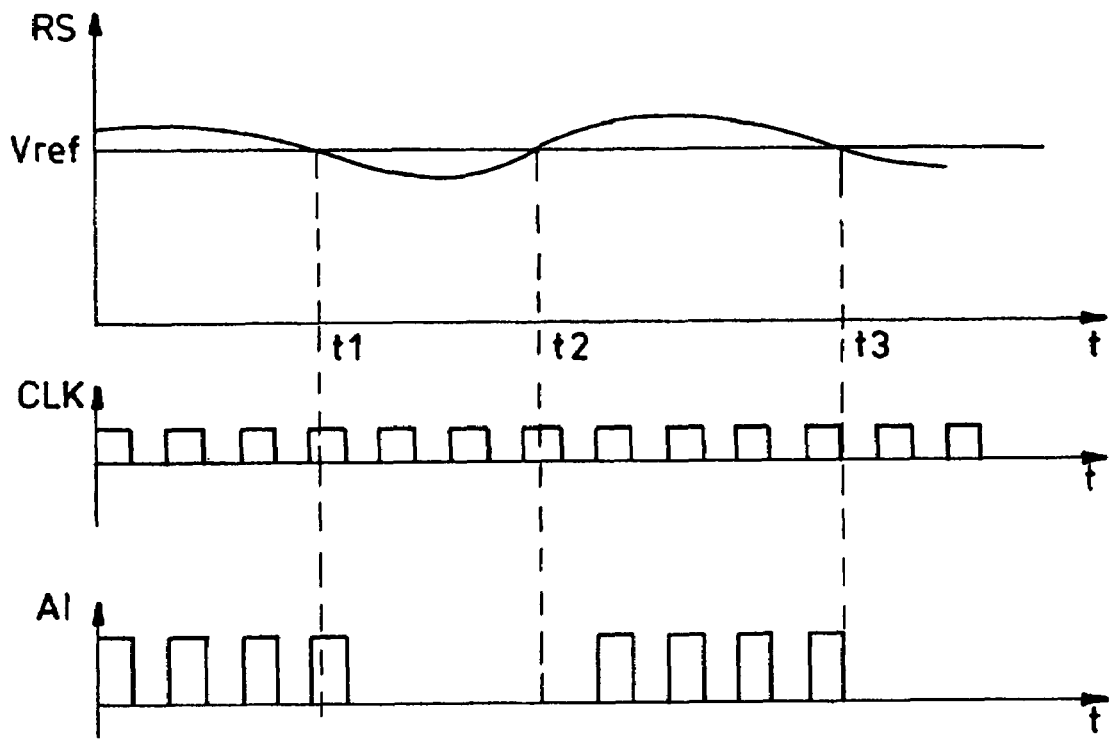
FIG. 2 shows time profiles of selected signals in the switching converter in accordance with FIG. 1.

FIG. 2 shows by way of example a time profile of the control signal RS, which fluctuates about the constant reference voltage signal Vref in the example. FIG. 2 furthermore shows the time profile of a clock signal CLK and also the time profile of a drive signal having drive pulses AI for the power transistor T1.

The comparator arrangement K1 compares the control signal RS with the reference voltage signal Vref at periodic time intervals, prescribed by rising edges of the clock signal CLK in the example. In this case, if the control signal RS is greater than the reference voltage signal Vref, as is the case between the instants t0 and t1 and the instants t2 and t3, then the comparator arrangement generates a drive pulse with each rising edge of a clock pulse at which the control signal RS is greater than the reference signal Vref, the duration of the drive pulses AI corresponding to the duration of the clock pulses of the clock signal CLK in the exemplary embodiment. If the control signal RS is less than the reference signal Vref, then no drive pulses are generated, as is illustrated within a period of time between the instants t1 and t2.

Figure 3:
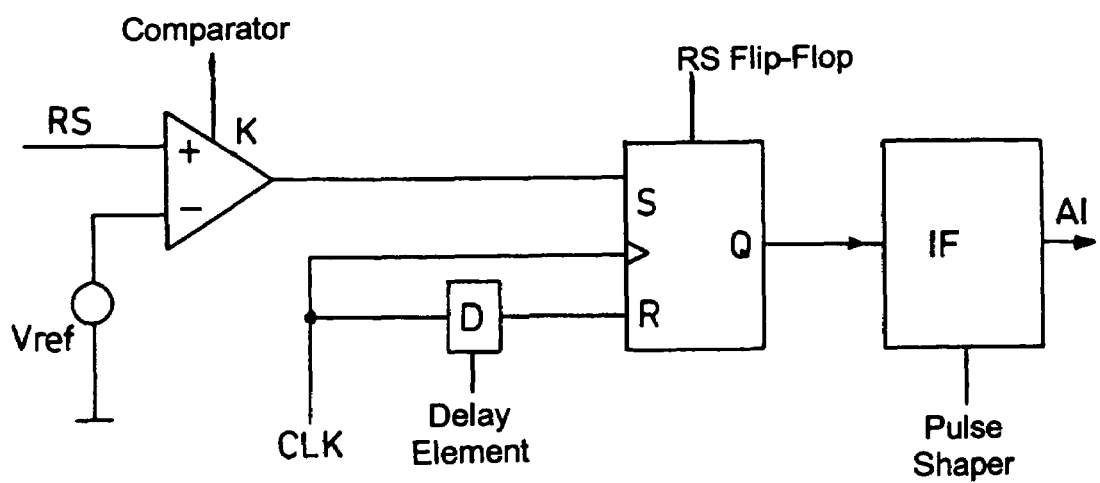
FIG. 3 shows an exemplary embodiment of a drive circuit.

FIG. 3 shows an exemplary embodiment of a circuitry realization of a clocked comparator arrangement K1 in accordance with FIG. 1. In this case a comparator K1 is provided, whose noninverting input is fed the control signal and whose inverting input is fed the reference signal Vref. An output signal of the comparator K is fed to a set input S of an RS flip-flop FF, which is driven in clocked fashion by the clock signal CLK. For this purpose, the clock signal CLK is fed to a clock input of the RS flip-flop FF. In this case, the RS flip-flop is designed in such a way that it accepts the signal present at its set input S in each case with a rising edge of the clock signal CLK. If the output signal of the comparator K has an upper level because the control signal RS is greater than the reference signal Vref, then the flip-flop FF is set with a rising edge of the clock signal CLK and a signal with an upper drive level is available at the output Q of the flip-flop. A reset input R of the flip-flop FF is fed a clock signal delayed by means of a delay element D, the flip-flop FF being reset after a delay time prescribed by the delay element D has elapsed after a rising edge of the clock signal CLK. In this case, the delay element D determines the duration of a generated drive pulse, a drive circuit in accordance with FIG. 3 being able to generate drive pulses which—unlike the illustration in FIG. 2—may be shorter or longer than half period durations of the clock signal CLK.

Figure 4:
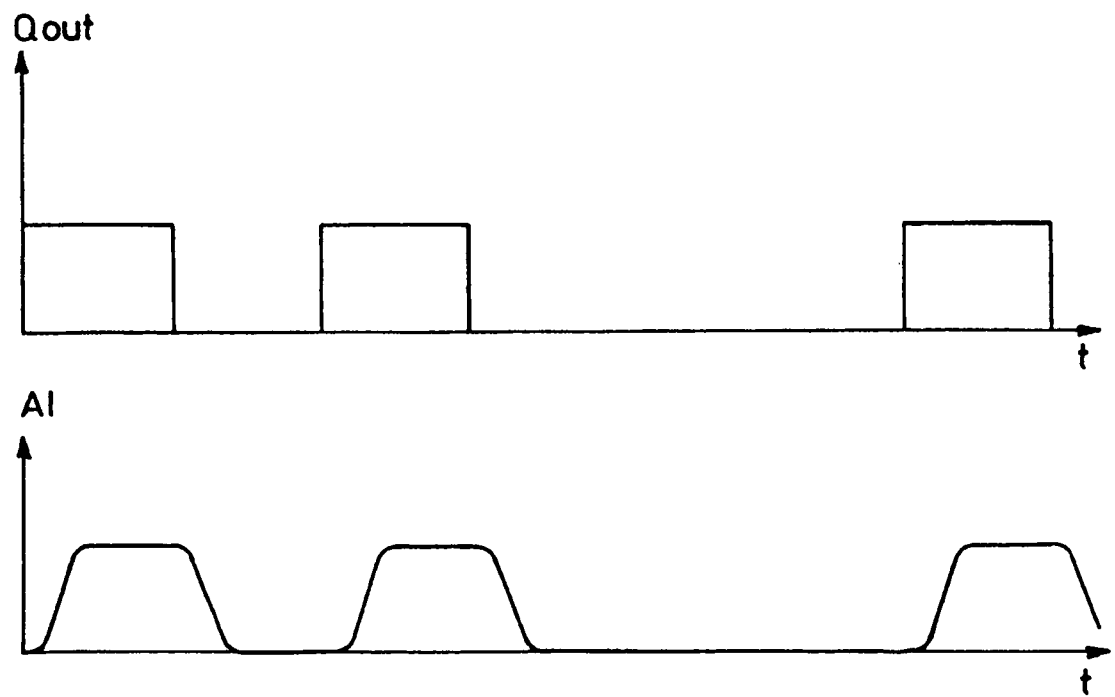
FIG. 4 shows time profiles of selected signals in a drive circuit in accordance with FIG. 3.

In the exemplary embodiment, a pulse shaper IF is connected downstream of the flip-flop FF, which pulse shaper generates, from the pulses which are present at the output of the flip-flop Q and alternate between a lower and an upper logic level, drive pulses AI for the power transistor T1 which are optimized, by way of example, with regard to electromagnetic interference radiation that arises during the switching of the transistor. FIG. 4 shows by way of example the time profiles of an output signal Qout present at the output Q of the flip-flop FF and of the drive pulses AI formed from these "hard" rectangular pulses by means of the pulse shaper IF and having more slowly rising and more slowly forming edges. The electromagnetic interference radiation that arises when the power transistor is switched on and off can be reduced when driving the transistor by means of such pulses.

Figure 5:
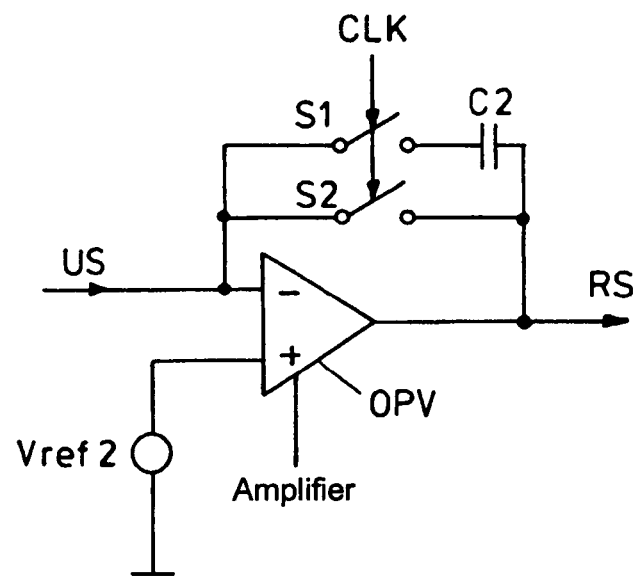
FIG. 5 shows an exemplary embodiment of a controller arrangement.

FIG. 5 shows an exemplary embodiment of a controller arrangement for providing a control signal RS from the output voltage signal US proportional to the output voltage Uout and a second reference voltage signal Vref2. The controller arrangement has an operational amplifier OPV, whose noninverting input is fed the reference voltage signal Vref2 in the exemplary embodiment and whose inverting input is fed the output voltage signal US and a signal fed back from an output of the operational amplifier OPV. For feeding back the output signal to the inverting input, the controller arrangement has a circuit arrangement with a first switch S1, connected in series with a capacitor C2, and a second switch S2, the second switch S2 being connected in parallel with the series circuit comprising the first switch S1 and the capacitor C2. The first and second switches S1, S2 are opened and closed according to a clock signal CLK, said clock signal preferably corresponding to the clock signal according to which the comparator arrangement in the drive circuit AS1 evaluates the control signal RS.

The controller illustrated in FIG. 5 has a proportional and an integral control action, the proportional component being effected from the feedback of the output signal via the second switch S2 and the integral component being effected from the feedback of the output signal via the arrangement comprising the first switch S1 and the capacitance C2. The clocked driving of the first and second switches S1, S2 has the effect that the output voltage signal US is evaluated only for time durations respectively prescribed by the clock signal CLK for the formation of the control signal RS.

Figure 6:
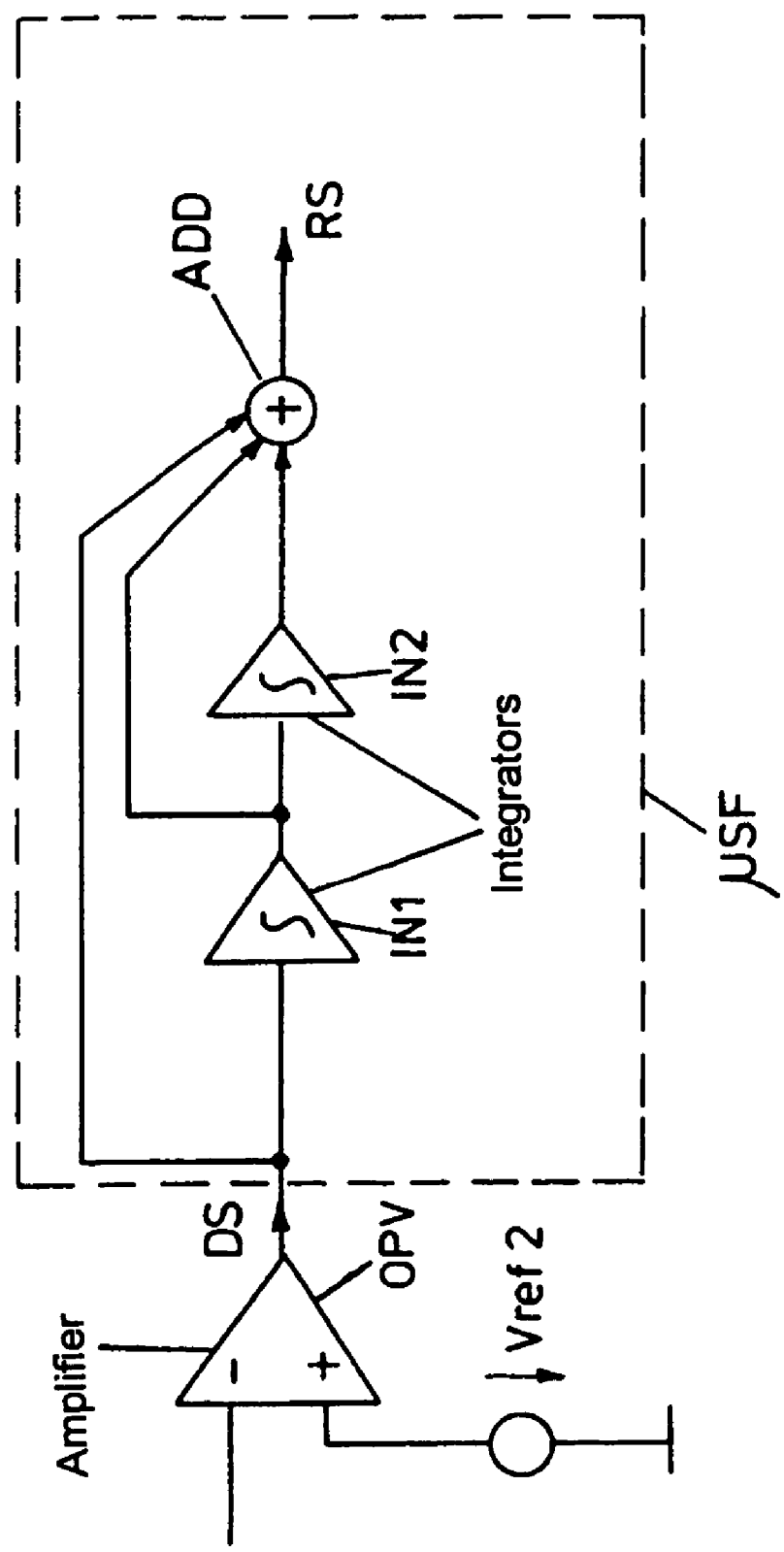
FIG. 6 shows a further exemplary embodiment of a controller arrangement, which has a noise shaping filter.

A further embodiment of the invention as illustrated in FIG. 6 provides a controller arrangement in which the output voltage signal US is compared with a reference signal Vref2 by means of an operational amplifier OPV, a differential signal DS made from the output voltage signal US and the reference signal Vref2 being present at the output of the operational amplifier, said differential signal rising as the output voltage decreases. In accordance with the further embodiment of the invention, a sufficiently known noise shaping filter is connected downstream of said operational amplifier in order to smooth fluctuations of the differential signal DS which result from fluctuations of the output voltage, in order thus to prevent a feedback of the fluctuations in the control loop. In the switching converter according to the invention, fluctuations of the output signal result in particular from the fact that the switching converter takes up energy only in discrete quantities of energy prescribed by the form and duration of the drive pulses. The use of a noise shaping filter constitutes an effective and simple-to-realize measure for smoothing the fluctuations of the differential signal DS.

The noise shaping filter illustrated has two cascaded integrators IN1, IN2, the first integrator IN1 being fed the differential signal DS and the second integrator IN2 being fed the output signal of the first integrator IN1. An adder ADD adds the differential signal DS and the output signals of the two integrators and provides the control signal RS.

In the switching converter according to the invention, both the duration and the form of the drive pulses and the minimum time interval between two drive pulses are fixedly prescribed. The minimum time interval between two drive pulses is prescribed by the period duration of the clock signal CLK, which determines the periodically recurring instants at which the control signal RS is compared with the reference voltage signal Vref. The minimum interval between two drive pulses corresponds to the period duration of the clock signal. Moreover, the time duration between two drive pulses is a whole-part multiple of the period duration of the clock signal CLK. In this case, the clock signal CLK is chosen such that it is possible to generate drive pulses with the highest possible frequency in order in this way to achieve the finest possible degradation of the power consumption or power output of the switching converter. On the other hand, the frequency of the clock signal CLK is chosen such that the switching losses remain within a tolerable framework with regard to the respective application. The maximum power consumption of the switching converter is achieved when the transistor is switched on with each clock pulse of the clock signal. The control of the power consumption is effected according to the invention only by means of a decision as to whether or not a drive pulse is to be generated. The form and duration of the drive pulses and the time interval between the latter are fixedly prescribed.

Figure 7:
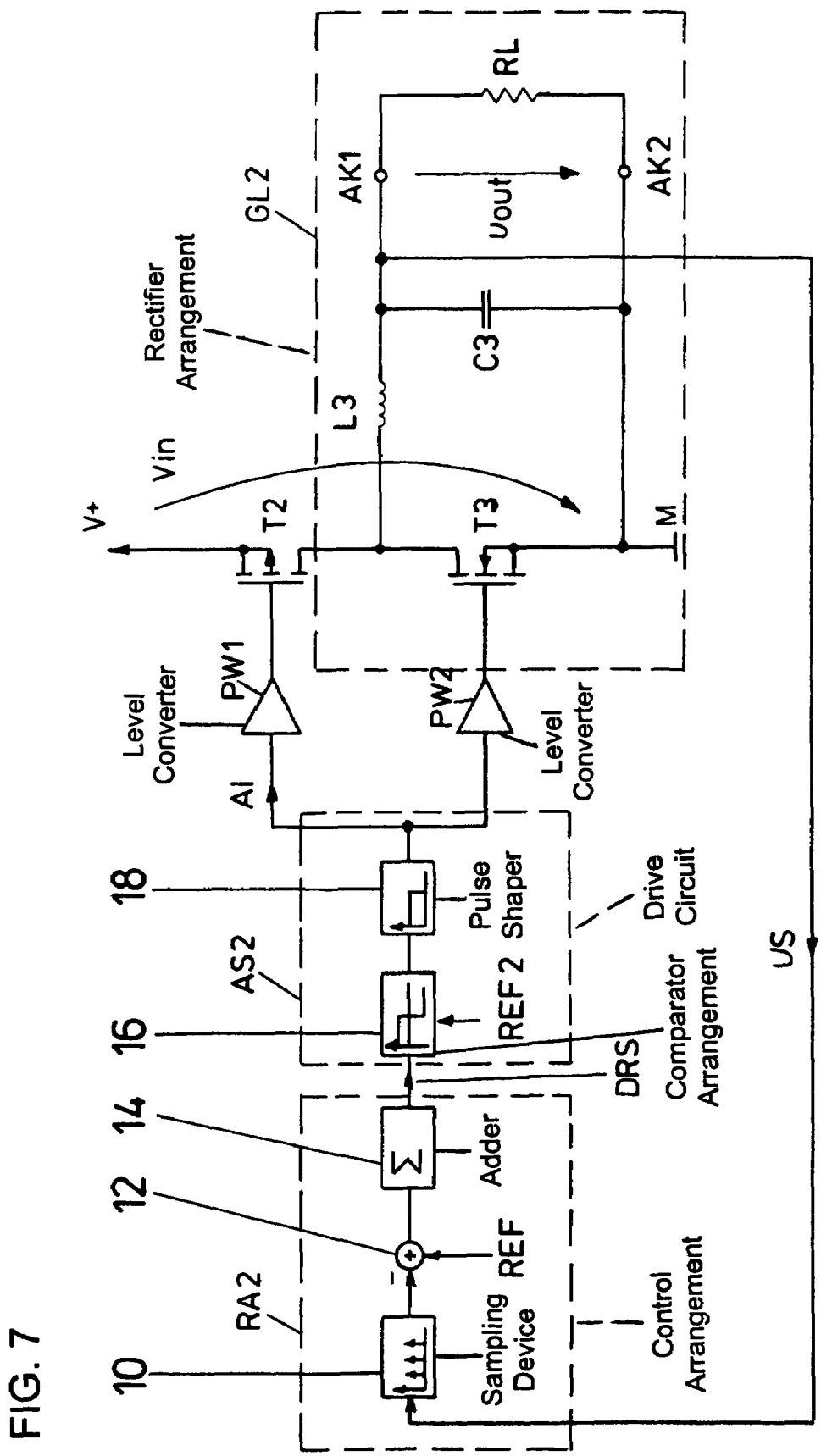
FIG. 7 shows a further exemplary embodiment of a switching converter according to the invention.

FIG. 7 shows a further exemplary embodiment of a switching converter according to the invention, which is designed as a downconverter or buck converter. In this case, a series circuit of a coil L2 and a capacitor C2 is connected, in series with a switch T2 designed as a power transistor, to a supply voltage Uin between terminals for supply potential and reference-ground potential M. An output voltage Uout can be tapped off at output terminals AK1, AK2 connected to terminals of the capacitor C2. A second switch T3 is connected in parallel with the series circuit comprising the coil L3 and the capacitor C3, which second switch is driven complementarily to the first switch T1 and acts as a freewheeling element when the first switch T2 is in the off state. In this case, the second switch T3 may also be replaced by a diode. In this switching converter, in which the arrangement comprising the coil L3 and the capacitor C3 and also the second switch T3 forms a rectifier arrangement GL2, there is no DC isolation between the input voltage Uin and the output voltage Uout, i.e. both voltages are referred to reference-ground potential M. In this case, the output voltage signal US can be tapped off directly as voltage with respect to reference-ground potential M at the output terminal AK1.

A controller arrangement RA2, which is fed the output voltage signal US, is realized digitally in the exemplary embodiment. In this case, the output voltage signal US is firstly fed to a sampling device 10, which samples the output voltage signal US and provides samples of the output voltage signal US at an output at periodic time intervals. Said samples of the output voltage signal US are subtracted from a reference signal REF in a subtraction unit connected downstream of the sampling device 10. The discrete-time differential signal present at an output of the subtraction unit 12 is fed to an adder 14, which sums a prescribed number of successive values of the discrete-time differential signal, a discrete-time control signal DRS being available at the output of the summing unit 14.

This discrete-time control signal DRS is fed to a comparator arrangement 16 in a drive circuit AS2 connected downstream of the control arrangement RA2, which compares the discrete-time control signal DRS value by value with a reference signal REF2, the function of which corresponds to the reference voltage signal Vref in accordance with FIG. 2. The comparator arrangement 16 is designed in such a way that a two-valued discrete-time signal is available at is output, the output signal of the comparator arrangement 16 assuming a first value if the discrete-time control signal DRS is greater than the reference signal REF2, and the output signal of the comparator arrangement 16 assuming a second value if the discrete-time reference signal DRS is less than the reference signal REF2. The discrete-time two-value output signal of the comparator arrangement 16 is fed to a pulse shaper 18, which generates drive pulses of a predetermined duration according to the two-valued output signal of the comparator unit 16. In this case, a drive pulse is generated if the output signal of the comparator unit 16 assumes the first signal value that is to say if the discrete-time control signal DRS is greater than the reference signal REF2.

The drive pulses AI generated by the pulse shaper 18 are preferably rectangular-waveform pulses which are fed to level converters PW1, PW2 respectively connected upstream of the gate terminals of the first transistor T2 and of the second transistor T3. The level converters PW1, PW2 generate voltage signals suitable for driving the transistors T2, T3 from the logical drive levels of the drive pulses AI of the pulse shaper. The form of the drive pulses AI and of the voltage pulses generated from the drive pulses AI by the first level converter PW1 for the first transistor T2 are coordinated with one another in such a way that the first transistor T2 is in each case turned on for a predetermined time duration if the output signal of the comparator arrangement 16 assumes a signal value which results from a discrete control signal RS that is greater than the reference signal REF2. The first switch is thus turned on by a drive pulse in order to enable current to be taken up for the coil L3 when an instantaneous value of the discrete-time control signal DRS is greater than the reference signal REF2.

The second level converter PW2 generates from the drive pulses AI drive signals for the second transistor T3 which are chosen such that the second transistor T3 always turns off if the first transistor T2 turns on, and vice versa.

I claim:

1. A switching converter, comprising:
a switch including a control terminal, a first load terminal, and a second load terminal;
a rectifier configuration connected to said switch, said rectifier configuration including a plurality of output terminals for providing an output voltage to a load;
a controller configuration for providing a control signal dependent on the output voltage; and
a drive circuit for generating drive pulses, said drive circuit comparing the control signal with a reference signal in periodical time periods, and, in dependence on the comparison, providing a drive pulse of a given duration or no drive pulse;
said drive pulses turning said switch on and off.

2. The switching converter according to claim 1, wherein said drive circuit is configured for generating the plurality of drive pulses with an identical duration and at an identical time interval depending on whether the control signal is greater or less than a reference signal.

3. The switching converter according to claim 1, wherein said controller configuration includes a proportional controller, a proportional-integral controller, or an integral controller.

4. The switching converter according to claim 1, wherein said drive circuit includes a clocked comparator configuration being fed with the control signal, a first reference signal and a clock signal.

5. The switching converter according to claim 4, wherein:
the clock signal has a timing;
said clocked comparator configuration generates the plurality of drive pulses if the control signal is greater than the first reference signal; and
the plurality of drive pulses each have a predetermined time duration and a timing corresponding to the timing of the clock signal.

6. The switching converter according to claim 1, wherein said controller configuration is a digital controller configuration providing a discrete-time control signal.

7. The switching converter according to claim 6, wherein:
said drive circuit includes a digital comparator configuration and a pulse shaping filter connected downstream of said digital comparator configuration; and
said pulse shaping filter has an output for providing the plurality of drive pulses.

8. The switching converter according to claim 1, wherein said controller configuration includes a noise shaping filter being fed with a signal dependent on the output voltage.

9. The switching converter according to claim 1, further comprising:
a level converter having an input being fed with the plurality of drive pulses and an output connected to said control terminal of said switch.

10. The switching converter according to claim 1, wherein said rectifier configuration includes a coil connected in series with said switch.

11. A method for driving a switch in a switching converter having a rectifier configuration connected to the switch, the method which comprises:
generating a control signal dependent on an output voltage provided by the rectifier configuration; and
comparing the control signal with a reference signal in periodical time periods to form a comparision result; and
generating a drive signal with drive pulses and, depending on the comparison result, providing a drive pulse of a given duration or no drive pulse.

12. The method according to claim 11, which comprises:
providing the control signal with a signal component formed by integrating a differential signal made from a signal proportional to the output voltage and a reference signal.

13. The method according to claim 11, which comprises:
providing the control signal with a signal component proportional to the output voltage.

14. The method as according to claim 11, which comprises forming the drive pulses with a timing of a clock signal depending on whether the control signal is greater or less than a reference value.

\* \* \* \* \*